United States Patent [19]

Shimozawa et al.

[11] Patent Number: 5,438,113
[45] Date of Patent: Aug. 1, 1995

[54] THERMOSETTING RESIN COMPOSITION

[75] Inventors: Hiroshi Shimozawa, Yokohama; Shinetsu Fujieda; Shuzi Hayase, both of Kawasaki; Yoshihiko Nakano, Tokyo; Akira Yoshizumi, Yokohama; Ken Uchida, Tokyo, all of Japan

[73] Assignee: Kabushiki Kaisha Toshiba, Kawasaki, Japan

[21] Appl. No.: 40,267

[22] Filed: Mar. 30, 1993

[30] Foreign Application Priority Data

Mar. 30, 1992 [JP] Japan .................................. 4-071990
Jul. 29, 1992 [JP] Japan .................................. 4-201709

[51] Int. Cl.⁶ ............................................. C08G 77/04
[52] U.S. Cl. ........................................ 528/25; 528/27; 525/431; 525/476
[58] Field of Search ................ 528/25, 27; 525/431, 525/476

[56] References Cited

U.S. PATENT DOCUMENTS 4,783,495 11/1988 Pastor et al. ..................... 524/263

FOREIGN PATENT DOCUMENTS 60-58425 4/1985 Japan .

Primary Examiner—Melvyn I. Marquis
Assistant Examiner—Helen F. Lee
Attorney, Agent, or Firm—Oblon, Spivak, McClelland, Maier & Neustadt

[57] ABSTRACT

A thermosetting resin composition containing a silane compound a) having at least one phenolic hydroxyl group, and an organic compound b) having at least two functional groups capable of reaction with the phenolic hydroxyl group of the silane compound, wherein the silane compound a) is added in an amount of more than 10 parts by weight relative to 100 parts by weight of the organic compound b).

10 Claims, No Drawings

THERMOSETTING RESIN COMPOSITION

BACKGROUND OF THE INVENTION

1. Field of the Invention

The present invention relates to a thermosetting resin composition comprising a thermosetting resin as a main component and a silane compound.

2. Description of the Related Art

In recent years, vigorous researches are being made on plastic materials exhibiting a high resistance to heat, a low hygroscopicity, and a low internal stress in an attempt to provide construction materials used in the manufacture of general industrial equipments, automobiles and space engineering equipments. The plastic materials of this type include, for example, engineering plastic materials such as an epoxy resin, polyimide resin, PPS (polyphenylenesulfide), and PES (polyethersulfone). These plastic materials are used in the form of a resin composition prepared by adding a curing agent and other suitable additives to these plastic materials depending on the use of the plastic materials.

However, the conventional resin composition fails to meet simultaneously all of the requirements for a high resistance to heat, a low hygroscopicity and a low internal stress, making it difficult to use the conventional composition as construction materials in various fields.

In the field of semiconductor devices, resin compositions containing as a main component a thermosetting resin such as an epoxy resin are widely used as an encapsulating resin for a semiconductor element. The resin composition of this type exhibits, when cured, excellent properties including a high resistance to humidity, a high moldability, and satisfactory electrical properties under high temperatures and, thus, is widely used for molding.

However, the miniaturization of each functional unit on a semiconductor element and the enlargement of the semiconductor element pellet itself are being promoted rapidly in accordance with the prominent progress achieved in recent years in the integration of the semiconductor element. These changes in the semiconductor element pellet have now caused the conventional encapsulating resin to fail to satisfy the severe requirements such as a high resistance to a thermal shock. To be more specific, if a large pellet having a fine surface structure is encapsulated with a resin composition containing as a main component the conventional thermosetting resin, splitting tends to take place in the phosphosilicate glass film or the silicon nitride film serving to protect an aluminum wiring pattern formed on the surface of the pellet. Also, the encapsulating resin itself tends to be cracked. The cracking is serious particularly where a sample is subjected to a thermal cycle test (TCT test). Naturally, the appearance and reliability of the semiconductor device are markedly impaired.

What should also be noted is that, when a semiconductor device is soldered to a substrate in mounting the semiconductor device, the entire apparatus receives a severe thermal shock. Specifically, the entire apparatus is exposed to an atmosphere of such a high temperature as 200° to 260° C. for 5 to 90 seconds. In this step, the moisture taken into the package is evaporated so as to bring about cracking in the encapsulating resin.

For dealing with these splitting and cracking problems, vigorous studies are being made in an attempt to develop an encapsulating resin of a low internal stress, which exhibits an excellent resistance to cracking when a cured material obtained by using the encapsulating resin receives a thermal shock. It is known to the art that the internal stress of a cured material formed from an encapsulating resin can be lowered by adding a silicone oil or a silicone rubber to the resin composition. Where a silicone oil is simply added in the step of preparing a resin composition, however, the silicone oil bleeds off when the resin composition is molded or cured. As a result, the appearance of the molded article is impaired. Also, the mold is stained in many cases. On the other hand, in the case of adding a silicone rubber, the melt viscosity of the resin composition is increased, giving rise to problems such as reduction in the mechanical strength of the encapsulating resin.

As a measure for overcoming the above-noted problems inherent in the prior art, a technique of adding a silicone oil or a silicone rubber having a functional group such as a hydroxyl group to a resin composition is disclosed in, for example, Published Unexamined Japanese Patent Application No. 58-34824 and Published Examined Japanese Patent Application No. 2-34181. However, a resin encapsulated semiconductor device prepared by encapsulating a semiconductor device with the resultant encapsulating resin fails to exhibit a sufficient resistance to a thermal shock. Further, the encapsulating resin leaves much room for further improvement in its resistance to humidity.

SUMMARY OF THE INVENTION

An object of the present invention is to provide a novel thermoserring resin composition which can provide a plastic material exhibiting a high resistance to heat, a low hygroscopicity and a low internal stress in good balance.

Another object is to provide a thermosetting resin composition of a low internal stress, which is excellent in its resistance to thermal shock and in its resistance to humidity and, thus, is adapted for use as a semiconductor encapsulating resin.

According to a first embodiment of the present invention, there is provided a thermosetting resin composition, comprising as indispensable components:

(a) a silane compound represented by general formula (I) given below:

where each of $R_1$, $R_2$, $R_3$ and $R_4$ is a monovalent organic group, at least one of $R_1$ and $R_2$ being a monovalent organic group having a phenolic hydroxyl group, and m and n are integers not less than zero, m+n being not larger than 12 (m+n≦12), m being not smaller than 2 (m≧2) where only one of $R_1$ and $R_2$ has a phenolic hydroxyl group, and m being not smaller than 1 (m≧1) where both $R_1$ and $R_2$ have phenolic hydroxyl groups; and (b) an organic compound having at least two functional groups capable of reaction with the phenolic hydroxyl groups of said silane compound.

According to a second embodiment of the present invention, there is provided a thermosetting resin composition, comprising as indispensable components:

(A) a thermosetting resin;

(B) a curing agent of said thermosetting resin; and (C) a polysilane copolymer having monomer units represented by general formulas (II) and (III) given below:

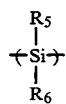
(II)

where $R_5$ and $R_6$, which may be the same or different, are monovalent organic groups each having 1 to 24 carbon atoms, at least one of $R_5$ and $R_6$ having a hydroxyl group;

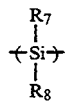
(III)

where $R_7$ and $R_8$, which may be the same or different, are monovalent organic groups each having 1 to 24 carbon atoms.

The thermosetting resin composition according to the first embodiment of the present invention comprises as a main resin component the organic compound (b) having at least two functional groups capable of reaction with a phenolic hydroxyl group. The resin composition also comprises a silane compound (a) having at least two phenolic hydroxyl groups, as shown in formula (I). The silane compound (a) is used as a curing agent. In the resin composition of the first embodiment, the silane compound (a) serves to achieve crosslinking of the organic compound (b) so as to provide a cured material of a three dimensional structure.

The silane compound (a) has an internuclear distance of 2.34 Å when it comes to the Si-Si bond constituting the main chain of the silane compound and an internuclear distance of 1.94 Å when it comes to the Si-C bond between the main chain and a side chain of the silane compound. Particularly, the internuclear distance of the Si-Si bond is longer than the internuclear distance of the C-C bond, which is 1.54 Å, constituting the main chain of an ordinary organic compound, e.g., the main chain of a resin main component. It follows that the cured material obtained by using a resin composition according to the first embodiment of the present invention is excellent in, particularly, the flexibility in the crosslinked portion, leading to reduction in the internal stress of the cured material.

It should also be noted that the sum of the constituting units of a single molecule of silane compound (a), which acts as a crosslinking agent, falls within a predetermined range. As a result, the melt viscosity is prevented from being excessively increased in the resin composition according to the first embodiment of the present invention, leading to an improved moldability of the composition. In addition, the degree of crosslinking is increased in the cured material, leading to an improved heat resistance of the cured material. what should also be noted is that the hydrophobic group other than the phenolic hydroxyl group present in the molecule of the silane compound (a) makes it possible to suppress the hygroscopicity of the cured material.

The thermosetting resin composition according to the second embodiment of the present invention comprises a polysilane copolymer acting as a modifying agent in addition to a thermosetting resin A acting as a main component of the resin composition and a curing agent B of the thermosetting resin A. The polysilane copolymer comprises a monomer unit represented by formula (II). As shown in formula (II), the monomer unit comprises organic groups $R_5$ and $R_6$. What should be noted is that a hydroxyl group is substituted for a hydrogen atom included in at least one of these organic groups $R_5$ and $R_6$. The substituted hydroxyl group alone is compatible with the thermosetting resin constituting the main component of the composition. It follows that, in the cured material obtained by using the resin composition of the second embodiment, the polysilane copolymer is uniformly dispersed finely into the matrix to form a so-called "sea-island" structure, with the result that the internal stress of the cured material is markedly lowered.

Further, the main chain of the polysilane copolymer is rigid, compared with the main chain of, for example, a silicone rubber, with the result that a decrease of a glass transition temperature of the cured material is lowered. In addition, the polysilane copolymer itself has a high heat resistance so as to enable the resin composition to exhibit a high resistance to heat. It should be noted, however, that the main chain of the polysilane copolymer is nonpolar, with the result that the humidity resistance of the resin composition is also improved by the presence of the polysilane copolymer.

The prominent properties described above enable the thermosetting resin composition according to the second embodiment of the present invention to be adapted for use as an encapsulating resin of a semiconductor device.

DETAILED DESCRIPTION OF THE PREFERRED EMBODIMENTS

In the thermosetting resin composition according to the first embodiment of the present invention, the silane compound (a) acts as a curing agent, and the organic compound (b) constitutes the main resin component of the composition. To be more specific, when the resin composition is subjected to a heat treatment at a predetermined temperature, the silane compound (a) permits crosslinking the organic compound (b) so as to form a cured material having a three dimensional polymer structure.

The silane compound (a) contained in the thermosetting resin composition of the first embodiment has a Si-Si main chain as apparent from formula (I). It should be noted that the silane compound (a) has at least two phenolic hydroxyl groups in a single molecule. Because of the presence of these phenolic hydroxyl groups, each molecule of the silane compound (a) carries out reactions with at least two molecules of the organic compound (b) so as to crosslink the organic compound (b).

What should also be noted is that the sum of the constituting units of a single molecule of the silane compound (a), i.e., the value of (m+n) in formula (I), is defined to be 12 or less in the present invention. Where the value of (m+n) exceeds 12, the melt viscosity of the resin composition is increased, with the result that the moldability of the resin composition tends to be adversely affected. Further, a cured material obtained by using the resin composition of this type is unduly diminished in the crosslinking density and, thus, tends to be lowered in its heat resistance.

Where the silane compound (a) has at least two phenolic hydroxyl groups in a single molecule, and the value of (m+n) in formula (I) is 12 or less, it is possible for the constituting unit including the organic group having a phenolic hydroxyl group to be optionally arranged within the molecule of the silane compound (a). For example, where the silane compound (a) is a copolymer consisting of constituting units each including the organic group having a phenolic hydroxyl group and other constituting units which do not include the organic group having a phenolic hydroxyl group, the silane compound (a) may be in the form of any of a block copolymer, a random copolymer and an alternating copolymer. Further, the Si-Si main chain of the silane compound (a) may be either cyclic or linear. Still further, compounds of different chemical structures may be used together.

In the thermosetting resin composition according to the first embodiment of the present invention, it is desirable for the value of (m+n) of the silane compound (a) to fall within a range of between 6 and 12 and for the silane compound (a) to be of a cyclic structure, in view of, particularly, the heat resistance of the cured material of the resin composition.

As described previously, each of $R_1$ and $R_2$ included in formula (I) representing the silane compound (a) denotes a monovalent organic group. At least one of the monovalent organic groups $R_1$ and $R_2$ has a phenolic hydroxyl group. In other words, it is possible for one of $R_1$ and $R_2$ not to have a phenolic hydroxyl group. Each of $R_3$ and $R_4$ also denotes a monovalent organic group. The monovalent organic group represented by each of $R_3$, $R_4$ and the monovalent organic group which does not have a phenolic hydroxyl group, which is possibly represented by $R_1$ or $R_2$, includes, for example, methyl, ethyl, propyl, i-propyl, butyl, i-butyl, t-butyl, pentyl, hexyl, heptyl, octyl, nonyl, decyl, phenyl, tolyl, trifluoromethyl phenyl, a-naphthyl, p-biphenyl, pyridyl, amino phenyl, N-methyl pyrrolyl, furyl, thienyl and N-methyl indolyl groups.

The silane compound of the particular chemical structure can be synthesized, for example, as follows. In the first step, the hydroxyl group of bromophenol is protected by a protective group such as tetradimethyl silyl group within a solvent of tetrahydrofuran (THF). Then, ether is added to an activated magnesium, followed by dripping the bromophenol having the hydroxyl group protected as above to the resultant system so as to initiate a Grignard reaction. Further, a Grignard reagent formed by the reaction is dripped into a mixed solution consisting of trichlorobutyl silane and diethyl ether so as to form monomers of a silane compound. The monomers thus prepared are added to toluene having sodium dispersed therein while vigorously stirring the dispersion, followed by filtering the resultant system under pressure, condensing the filtrate and, then, dripping the concentrated filtrate so as to precipitate the formed polymer. Finally, the protective group included in the polymer is removed within a THF solvent having tetrabutyl ammonium fluoride dissolved therein so as to obtain a desired silane compound used in the present invention.

In the thermosetting resin composition according to the first embodiment of the present invention, curing agents such as a phenolic resin, an amine compound, and an acid anhydride can also be used together with the silane compound (a) described above.

The thermosetting resin composition of the first embodiment also comprises an organic compound (b) constituting the main component of the composition. The organic compound (b) has at least two functional groups capable of reaction with the phenolic hydroxyl group. The presence of these functional groups permits the organic compound (b) to perform reaction with the silane compound (a) and, thus, molecules of the organic compound (b) are crosslinked. In the present invention, a thermosetting resin which can be crosslinked to exhibit an excellent heat resistance is used as the organic compound (b). To be more specific, thermosetting resins such as epoxy resin, maleimide resin, an amine compound and an oxazoline compound can be used singly or in combination as the organic compound (b). In the thermosetting resin composition of the first embodiment, the combination of these thermosetting resins is selected appropriately to further improve the heat resistance of the cured material obtained from the resin composition.

Any epoxy resin can be used as organic compound (b) as far as at least two epoxy groups are contained in a single molecule of the epoxy resin. However, it is desirable to use an epoxy resin having an epoxy equivalent of 250 or less in view of the heat resistance of the resultant resin composition. Examples of the epoxy resin include, for example, a bisphenol A type epoxy resin, a novolak type epoxy resin, an alicyclic epoxy resin, an epoxy resin derived from tri- or tetra (hydroxyphenyl) alkane, and a bis-hydroxy biphenyl series epoxy resin. More specifically, the epoxy resin includes, for example, a phenol novolak type epoxy resin, a cresol novolak type epoxy resin, a naphthol type novolak epoxy resin, bisphenol A novolak type epoxy resin, a tris (hydroxyphenyl) alkane-based epoxy resin which is obtained by epoxidizing a condensate between phenol or alkyl phenols and hydroxybenzaldehyde, an epoxide of an tetra (hydroxyphenyl) alkane, epoxides of 2,2', 4,4'-tetraglycidoxy benzophenone, triglycidyl ether of p-amino phenol, polyarylglycidyl ether, 1,3,5-triglycidyl ether benzene, 2,2', 4,4'-tetraglycidoxy biphenyl, 4,4'-bis(2,3-epoxypropoxy) 3,3', 5,5'-tetramethylbiphenyl, and various halogenated epoxy resins. These epoxy resins can be used singly or in combination.

On the other hand, the bismaleimide resins used as the organic compound (b) include, for example, 2,2-bis (4-phenoxyphenyl)-N,N'-bismaleimide, N,N'-phenylene bismaleimide, N,N'-hexamethylene bismaleimide, N,N'-diphenylmethane bismaleimide, N,N'-oxy-di-p-phenylene bismaleimide, N,N'-4,4'-benzophenone bismaleimide, N,N'-p-diphenyl sulfone bismaleimide, N,N'-(3,3'-dimethyl) methylene-di-p-phenylene bismaleimide, poly (phenylmethylene) polymaleimide, bis (4-phenoxyphenyl) sulfone-N,N'-bismaleimide, 1,4-bis (4-phenoxy) benzene-N,N'-bismaleimide, 1,3-bis (4-phenoxy) benzene-N,N'-bismaleimide, and 1,3-bis (3-phenoxy) benzene-N,N'-bismaleimide. These maleimide resins can be used singly or in combination.

Where an epoxy resin is used as the organic compound (b), it is desirable to add the silane compound (a) in an amount of 30 to 150 parts by weight relative to 100 parts by weight of the epoxy resin in the thermoserring resin composition according to the first embodiment of the present invention. If the amount of the silane compound (a) is smaller than 30 parts by weight, the resultant resin composition is rendered poor in its curing characteristics. On the other hand, if the silane compound (a) is added in an amount exceeding 150 parts by weight, the cured material of the resultant resin composition tends to be rendered poor in its reliability in terms of the humidity resistance. Preferably, the silane compound (a) should be added in an amount falling within a range of between 50 and 100 parts by weight relative to 100 parts by weight of the epoxy resin.

Where a maleimide resin is used as the organic compound (b), the silane compound (a) should be added in an amount of 10 to 50 parts by weight relative to 100 parts by weight of the maleimide resin. If the amount of the silane compound (a) is smaller than 10 parts by weight, the melt viscosity of the resultant resin composition is increased, with the result that a mold tends to fail to be filled completely with the resin composition in the molding step. Also, a wire flow is likely to take place. On the other hand, if the silane compound (a) is used in an amount larger than 50 parts by weight, the resultant resin composition is rendered poor in its curing characteristics. In addition, the cured material of the resin composition tends to be rendered poor in its heat resistance. Preferably, the silane compound (a) should be used in an amount falling within a range of between 20 and 40 parts by weight relative to 100 parts by weight of the maleimide resin.

In the thermosetting resin composition according to the first embodiment of the present invention, it is also possible to add an ordinary curing catalyst together with the indispensable components of the compounds (a) and (b). The curing catalyst used in the present invention is not particularly restricted as far as the curing catalyst can be applied to a thermosetting resin. For example, it is possible to use a basic catalyst and a peroxide in the present invention.

The basic catalyst noted above includes, for example, an organic phosphine compound, an imidazole compound or a derivative thereof, DBU, i.e., 1,8-diaza bicyclo (5,4,0) undecene-7, or a phenolic salt thereof. These basic catalysts can be used singly or in combination.

On the other hand, the organic phosphines which can be used as a curing catalyst in the present invention include, for example, trimethyl phosphine, triethyl phosphine, tributyl phosphine, triphenyl phosphine, tri (p-methylphenyl) phosphine, tri (nonylphenyl) phosphine, methyl diphenyl phosphine, dibutyl phenyl phosphine, tricyclohexyl phosphine, 1,2-bis (diphenyl phosphine) ethane, and bis (diphenyl phosphine) methane.

The imidazole compounds used as a curing catalyst include, for example, 2-methyl imidazole, 2,4-dimethyl imidazole, 2-ethyl-4-methyl imidazole, 2-phenyl imidazole, 2-phenyl-4-methyl imidazole, and 2-heptadecyl imidazole.

The phenolic salt of DBU noted above includes, for example, SA-853 (Sanapro).

Further, the peroxide compounds, which can be used as a curing catalyst in the present invention, include, for example, dialkyl peroxides such as di-t-butyl peroxide, dicumyl peroxide, t-butylcumyl peroxide, 2,5-dimethyl-2,5-di-t-butyl peroxy hexane; peroxy esters such as t-butyl peroxy acetate, t-butyl-peroxy phthalate, t-butyl peroxy benzoate, 2,5-dimethyl-2,5-benzoyl peroxy hexane, and t-butyl-peroxy-2-ethyl hexanoate; diacyl peroxides such as acetyl peroxide, isobutyryl peroxide, decanoyl peroxide, lauroyl peroxide, 3,5,5-trimethyl hexanoyl peroxide, benzoyl peroxide and di-2-ethylhexyl peroxy dicarbonate; hydro peroxides such as t-butylhydro peroxide, cumenehydro peroxide, and paramethanehydro peroxide; ketone peroxides such as methyl ethyl ketone peroxide and cyclohexanone peroxide; and peroxy ketals such as 1,1-bis (t-butyl peroxy) cyclohexane and 1,1-bis (t-butyl peroxy)-3,3,5-trimethyl cyclohexane.

Further, various additives can also be added to the thermoserring resin composition according to the first embodiment of the present invention. The additives include, for example, a low stress-imparting agent such as a silicone rubber, a silicone gell, a MBS resin or an ABS resin as well as an inorganic filler, a coupling agent, a mold release agent, a flame retardant and a coloring agent. Among these additives, the inorganic filler includes, for example, a quartz glass powder, a crystalline silica powder, a glass fiber, talc, an alumina powder, a calcium silicate powder, a calcium carbonate powder, a barium sulfate powder and a magnesia powder.

The thermosetting resin composition according to the first embodiment of the present invention can be prepared without difficulty by melting and kneading a mixture consisting of the indispensable components of the compounds (a) and (b) and other additives, as required, using, for example, a heat roll, a kneader or an extruder. Alternatively, a special mixer capable of finely pulverizing the raw material mixture can be used for preparing the thermosetting resin composition of the first embodiment. Of course, these techniques can be employed in a suitable combination to prepare easily the thermosetting resin composition of the first embodiment.

Let us describe more in detail the thermosetting resin composition according to the first embodiment of the present invention with reference to Examples which follow.

EXAMPLES 1–9 AND COMPARATIVE EXAMPLES 1–2

Prepared were thermosetting resin compositions shown in Table 1, and various properties of these resin compositions were evaluated. The specific compounds shown in Table 1 are as follows:

Epoxy Resin A

ESCN-195XL (trade name of o-cresol novolak type epoxy resin manufactured by Sumitomo Chemical Co. Ltd., having an epoxy equivalent of 197 and a softening point of 74° C.)

Epoxy Resin B

AER-745T (trade name of a flame retardant epoxy resin manufactured by Asahi Chemical Industry Co. Ltd., having an epoxy equivalent of 460 and a softening point of 70° C.)

Maleimide Resin

MB-3000H (trade name of diphenylmethane bismaleimide manufactured by Mitsubishi Petrochemical Co., Ltd., having an imide equivalent of 197 and a softening point of 170° C.)

Oxazoline Compound

PBO (1,3-phenylene bisoxazoline having an oxazoline equivalent of 109)

Phenolic Resin

BRG-556 (trade name of a phenol novolak resin manufactured by Showa High Polymer Co. Ltd., having a phenol equivalent of 104)

Curing Agent

Silane compound A: Hexa (p-hydroxyphenyl) hexamethyl cyclohexasilane having a hydroxyl equivalent of 136.2 and a molecular weight of 817.1

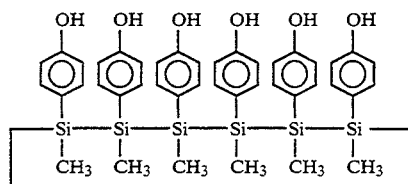

Silane compound B: Tetra (p-hydroxyphenyl) hexamethyl tetrasilane having a hydroxyl equivalent of 43.7 and a molecular weight of 574.8

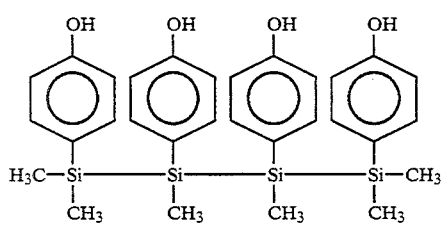

Silane compound C: 1,8-dihydroxy-octa (p-hydroxyphenyl) octamethyl octasilane having a hydroxyl equivalent of 140.4 and a molecular weight of 123.5

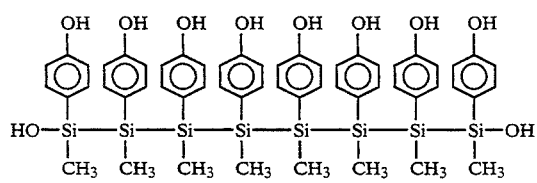

Silane compound D: Tetra (p-hydroxybenzyl) hexamethyl tetrasilane having a hydroxyl equivalent of 157.7 and a molecular weight of 630.9

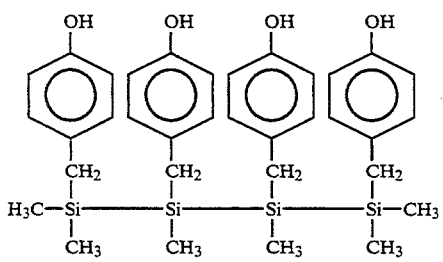

Silane compound E: Octa (p-hydroxybenzyl) dimethyl tetrasilane having a hydroxyl equivalent of 138.9 and a molecular weight of 1111.4

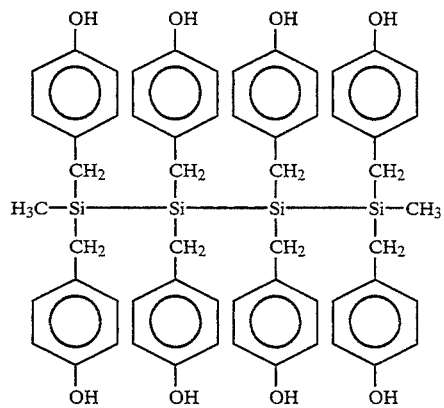

Silane compound F: 1,4-di (p-hydroxyphenyl)-octamethyl tetrasilane having a hydroxyl equivalent of 209.4 and a molecular weight of 418.7

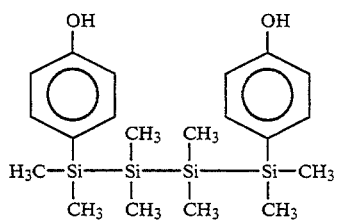

Curing Catalyst
Triphenyl phosphine
Mold Release Agent
Carnauba No. 1 (trade name of carnauba wax manufactured by Nippon Seiro K. K.)
Coloring Agent
CB#30 (trade name of carbon black manufactured by Mitsubishi Kasei Corporation)
Flame Retarding Assistant
Antimony trioxide manufactured by Mikuni Seiren K. K.
Inorganic Filler
GR-80AK (trade name of a fused silica powder manufactured by Toshiba Ceramic Co., Ltd.)
Surface Treating Agent
A-187 (trade name of γ-glycidoxy propyl trimethoxysilane manufactured by Nippon Unicar K. K.)

In preparing the resin composition, an inorganic filler was treated first with a silane coupling agent within a Henschel mixer, followed by putting the other components of the composition in the Henschel mixer to obtain a homogenous mixture. The resultant mixture was kneaded in a heat roll set at 60° to 110° C., followed by cooling and subsequently pulverizing the mixture to obtain a resin composition.

The resultant resin composition was molded in a desired shape by a low pressure transfer molding machine at 185° C. for 3 minutes, followed by applying an after-cure treatment to the molded article at 200° C. for 8 hours so as to obtain a test piece.

Each test piece was tested for measuring a glass transition temperature, a thermal expansion coefficient, a high temperature flexural modulus. (215° C.), a high temperature bending strength (215° C.), and water absorption rate (after moisture absorption treatment for 20 hours under 135° C. and a relative humidity of 85%). Table 2 shows the results.

TABLE 1

|  | Examples |  |  |  |  |  |  |  |  |  |  | Comparative Examples |  |
|---|---|---|---|---|---|---|---|---|---|---|---|---|---|
|  | 1 | 2 | 3 | 4 | 5 | 6 | 7 | 8 | 9 | 10 | 11 | 1 | 2 |
| Epoxy resin A | 12.4 | — | — | 12.3 | 13.1 | 11.6 | 12.3 | 10.1 | — | — | — | 14.2 | — |
| Epoxy resin B | 2.5 | 2.5 | 2.5 | 2.5 | 2.5 | 2.5 | 2.5 | 2.5 | 2.5 | 2.5 | 2.5 | 2.5 | 2.5 |
| Maleimide resin | — | 15.2 | 16.0 | — | — | — | — | — | — | 15.2 | 16.0 | — | 16.3 |
| Oxazoline compound | — | — | — | — | — | — | — | — | 9.5 | — | — | — | — |
| Phenolic resin | — | — | — | — | 4.1 | — | — | — | — | — | — | 7.1 | 5.0 |
| Silane compound A | 8.9 | 6.1 | — | — | 4.1 | — | — | — | 11.8 | 6.1 | 5.3 | — | — |
| Silane compound B | — | — | 5.3 | — | — | — | — | — | — | — | — | — | — |
| Silane compound C | — | — | — | 9.0 | — | — | — | — | — | — | — | — | — |
| Silane compound D | — | — | — | — | — | 9.7 | — | — | — | — | — | — | — |
| Silane compound E | — | — | — | — | — | — | 9.0 | — | — | — | — | — | — |
| Silane compound F | — | — | — | — | — | — | — | 11.2 | — | — | — | — | — |
| Curing catalyst | 0.2 | 0.2 | 0.2 | 0.2 | 0.2 | 0.2 | 0.2 | 0.2 | 0.2 | 0.2 | 0.2 | 0.2 | 0.2 |
| Mold release agent | 0.3 | 0.3 | 0.3 | 0.3 | 0.3 | 0.3 | 0.3 | 0.3 | 0.3 | — | — | 0.3 | 0.3 |
| Coloring aqent | 0.3 | 0.3 | 0.3 | 0.3 | 0.3 | 0.3 | 0.3 | 0.3 | 0.3 | — | — | 0.3 | 0.3 |
| Flame retarding assistant | 2.0 | 2.0 | 2.0 | 2.0 | 2.0 | 2.0 | 2.0 | 2.0 | 2.0 | — | — | 2.0 | 2.0 |
| Inorganic filler | 73.0 | 73.0 | 73.0 | 73.0 | 73.0 | 73.0 | 73.0 | 73.0 | 73.0 | — | — | 73.0 | 73.0 |
| Surface treating agent | 0.4 | 0.4 | 0.4 | 0.4 | 0.4 | 0.4 | 0.4 | 0.4 | 0.4 | — | — | 0.4 | 0.4 |

TABLE 2

|  |  | Examples |  |  |  |  |  |  |  |  | Comparative Examples |  |
|---|---|---|---|---|---|---|---|---|---|---|---|---|
|  |  | 1 | 2 | 3 | 4 | 5 | 6 | 7 | 8 | 9 | 1 | 2 |
| Glass transition temperature (°C.) | | 147 | 213 | 201 | 139 | 159 | 141 | 151 | 128 | 158 | 158 | 228 |
| Thermal expansion coefficient α1 (1/deg) × $10^{-5}$ | | 1.52 | 1.40 | 1.41 | 1.52 | 1.45 | 1.50 | 1.49 | 1.51 | 1.50 | 1.50 | 1.37 |
| Bending strength (kg/mm$^2$) | [room temp.] | 14.7 | 15.2 | 14.8 | 14.1 | 15.4 | 13.3 | 15.0 | 13.6 | 15.1 | 16.0 | 17.0 |
| | [240° C.] | 2.8 | 7.1 | 6.2 | 2.5 | 3.2 | 2.0 | 2.9 | 1.9 | 3.8 | 3.7 | 7.8 |
| Flexural modulus (kg/mm$^2$) | [room temp.] | 1300 | 1487 | 1328 | 1207 | 1412 | 1213 | 1268 | 1132 | 1415 | 1518 | 1789 |
| | [240° C.] | 75 | 789 | 549 | 70 | 81 | 69 | 77 | 52 | 90 | 90 | 917 |
| Melt viscosity (poise) [185° C.] | | 265 | 236 | 250 | 250 | 270 | 251 | 356 | 198 | 225 | 290 | 289 |
| Water absorption rate (ppm) [135° C./85% 20H] | | 4503 | 5015 | 4659 | 4002 | 5121 | 4432 | 4541 | 4132 | 4709 | 5690 | 7054 |

As apparent from Table 2, the resin compositions for Examples 1 to 9 are superior to the resin compositions for comparative Examples 1 and 2 in any of flexural modulus and water absorption rate. In other words, the experimental data clearly support that a cured material formed from the thermosetting resin composition of the present invention exhibits a high resistance to heat, a low internal stress and a low hygroscopicity.

EXAMPLE 10

All the components shown in Table 1 were dissolved and mixed in methyl ethyl ketone to obtain a uniform resin composition in the form of a varnish. Then, a glass cloth was impregnated with the resultant varnish, followed by drying the varnish-impregnated glass cloth to prepare a B-stage prepreg. Six sheets of the prepreg were laminated one upon the other, followed by disposing an electrolytic copper foil having a thickness of 30 microns on each of the upper and lower surfaces of the resultant laminate structure. The resultant structure was heated at 175° C. for 120 minutes under a pressure of 40 kg/cm$^2$, followed by an additional heat treatment at 200° C. for 120 minutes under a pressure of 50 kg/cm$^2$, so as to obtain a laminate board having the upper and lower surfaces covered with copper foils. The laminate board thus prepared was tested to measure the bonding strength of the copper foil to the prepreg, the dielectric constant, the dielectric loss tangent, and the chemicals resistance. Table 3 shows the results.

TABLE 3

|  |  | Example 10 |
|---|---|---|
| Copper foil bonding strength | A | 2.10 |
| | S4 | 1.98 |
| Dielectric constant <1 MHz> | | 4.8 |
| Dielectric loss tangent <1 MHz> (%) | | 0.59 |
| Chemicals resistance <Immersion for 24 hours at 25° C.> | 5% NaOH | No abnormality |
| | 5% $H_2SO_4$ | No abnormality |
| | Trichlene | No abnormality |
| | Gasoline (20° C., 120 hus) | No abnormality |

As apparent from Table 3, a laminate board prepared by using a thermosetting resin composition of the present invention is satisfactory in any of the bonding strength of the copper foil, dielectric constant, dielectric loss target and resistance to chemicals.

EXAMPLE 11

All the components shown in Table 1 were dissolved in methyl cellosolve to obtain a uniform resin composition in the form of a varnish. Then, an aluminum plate was coated with the resultant varnish, followed by applying a heat treatment at 80° C. for one hour and, then, at 140° C. for 15 hours, so as to obtain a coated film. The coated film on the aluminum plate was tested on electrical characteristics and the weight reduction caused by the heat treatment. Results are shown in Table 4.

TABLE 4

| Weight reduction by heating (%) | 200° C. | 6 |
| --- | --- | --- |
| | 250° C. | 21 |
| Volume resistivity (Ω-cm) | room temp. | $8.5 \times 10^{15}$ |
| | 180° C. | $4.5 \times 10^{15}$ |
| Dielectric loss tangent (%) | room temp. | 0.3 |
| | 180° C. | 0.3 |

As apparent from Table 4, a coated film prepared by using a thermoserring resin composition of the present invention is satisfactory in any of the electrical characteristics and the weight reduction by the heat treatment.

As described above in detail, the thermosetting resin composition according to the first embodiment of the present invention exhibits a high resistance to heat, a low hygroscopicity and a low internal stress in good balance when it is cured. It follows that the cured material prepared by using the resin composition of the present invention is adapted for use in various technical fields as a material of, for example, an encapsulating resin of a semiconductor device, a varnish and a laminate board. Of course, the resin composition of the first embodiment is of a very high industrial value.

The thermosetting resin composition according to the second embodiment of the present invention comprises a thermosetting resin A, which is a main component of the resin composition, a curing agent B for curing the resin A, and a polysilane copolymer C. The silane compound used in the first embodiment is an oligomer and acts as a crosslinking agent. On the other hand, the polysilane copolymer used in the second embodiment is a polymer and acts as a modifying agent, particularly, as an agent for lowering the internal stress of a cured material formed from the resultant composition.

In the thermosetting resin composition of the second embodiment, the thermosetting resin A used as a main component of the composition is not particularly restricted. Specifically, thermoserring resins used in an ordinary resin composition can be used singly or in combination. The specific thermosetting resin A used in the second embodiment of the present invention includes, for example, an epoxy resin, a maleimide resin, an amine compound and an oxazoline compound. Particularly, it is desirable to use an epoxy resin or a maleimide resin as the thermosetting resin A.

The epoxy resins enumerated previously in conjugation with the organic compound (b) used in the resin composition of the first embodiment can be used in the resin composition of the second embodiment as a main component of the composition.

where the thermoserring resin composition according to the second embodiment of the present invention is used as an encapsulating resin composition for a semiconductor device, it is desirable to suppress the chlorine ion content of the epoxy resin at 10 ppm or less and the hydrolyzable chlorine content at 0.1% by weight or less in order to suppress the corrosion of a metal material such as a wiring layer included in the semiconductor device.

The maleimide resins enumerated previously in conjunction with the organic compound (b) used in the resin composition of the first embodiment can also be used in the resin composition of the second embodiment as a main resin component of the composition.

The thermosetting resin A and the curing agent B are not particularly restricted in the thermosetting resin composition according to the second embodiment of the present invention. In other words, various curing agents can be used in accordance with the kind of the resin A used. For example, where an epoxy resin or a maleimide resin is used as the thermosetting resin A, materials generally known as a curing agent of an epoxy resin or a maleimide resin such as a phenolic resin, an organic acid anhydride and amines can be used as the curing agent B in the second embodiment. Particularly, it is desirable to use a phenolic resin as the curing agent B. The phenolic resin used as the curing agent B in the second embodiment includes, for example, novolak type phenolic resins such as phenol novolak resin, cresol novolak resin, t-butylphenol novolak resin, nonylphenol novolak resin, bisphenol F novolak resin, bisphenol A novolak resin, and naphthol novolak resin; polyoxy styrene such as poly (p-oxystyrene); phenol aralkyl resins such as a condensation polymer between 2,2'-dimethoxy-p-xylene and phenol monomer; tris (hydroxyphenyl) alkane-based compounds such as tris (hydroxyphenyl) methane, tris (hydroxymethyl phenyl) methane, tris (hydroxyphenyl) propane, and tris (hydroxyphenyl) methyl methane; and terpene phenolic resins. These phenolic resins can be used singly or in combination.

In the thermoserring resin composition according to the second embodiment of the present invention, the mixing ratio of the thermosetting resin A to the curing agent B depends on the kind of the resin A used. In the case of using, for example, an epoxy resin as the resin A, the curing agent B should be used in an amount of 0.5 to 1.5 chemical equivalents, preferably 0.8 to 1.2 chemical equivalents, relative to one chemical equivalent of the epoxy resin. To be more specific, when it comes to a resin composition containing a phenolic resin as a curing agent, the ratio of the number of phenolic hydroxyl groups contained in all the phenolic resin contained in the composition to the number of epoxy groups of all the epoxy resin contained in the composition, i.e., (the number of phenolic hydroxyl group/the number of epoxy grousp), should fall within a range of between 0.5 and 1.5, preferably between 0.8 and 1.2. Where the mixing ratio of the curing agent is less than 0.5, the resin composition tends to be cured insufficiently. On the other hand, if the mixing ratio noted above exceeds 1.5, the cured material of the resin composition tends to fail to exhibit a sufficiently high resistance to humidity.

Where a maleimide resin is used as the thermosetting resin A, a curing agent such as a phenolic resin should be added in an amount of 10 to 50 parts by weight, preferably 20 to 40 parts by weight, relative to 100 parts by weight of the maleimide resin. If the mixing amount of the curing agent is smaller than 10 parts by weight, the melt viscosity of the resin composition is increased, with the result that a molding apparatus tends to fall to be filled completely with the resin composition in the molding step. Also, a wire flow tends to take place easily. On the other hand, if the mixing amount of the curing agent exceeds 50 parts by weight, the resin composition fails to be cured sufficiently.

The polysilane copolymer C used as a modifying agent in the thermosetting resin composition according to the second embodiment of the present invention comprises the monomer units represented by formulas (II) and (III) described previously. The monovalent organic group represented by $R_5$ to $R_8$ in these formulas (II) and (III) includes, for example, an aliphatic hydrocarbon group, an alicyclic hydrocarbon group, an aromatic hydrocarbon group, and an organic group bonded to any of these hydrocarbon groups.

In the polysilane copolymer C, the copolymerization ratio of the monomer unit represented by formula (II) to the monomer unit represented by formula (III) should fall within a range of between 10:1 and 1:10, preferably between 7:3 and 3:7. If the copolymerization ratio of the monomer unit represented by formula (II) is higher than the upper limit of the range noted above, a major portion of the polysilane copolymer C is taken into the thermosetting resin A of the main component, with the result that the cured material obtained from the resin composition tends to be lowered in its resistance to heat. By the contrary, where the copolymerization ratio of the monomer unit represented by formula (III) is higher than the upper limit of the range noted above, the particles of the polysilane copolymer dispersed in the matrix are enlarged. It follows that the polysilane copolymer fails to be dispersed uniformly in the matrix, with the result that the cured material obtained from the resin composition tends to fail to exhibit a sufficiently low internal stress. In addition, the mechanical strength of the cured material tends to be lowered. Also, the outer appearance of the cured material is likely to be impaired.

The type of polymerization is not particularly restricted in the polysilane copolymer C used in the present invention. However, it is particularly desirable for the copolymer C to be a block copolymer consisting of the monomer units represented by formulas (II) and (III).

The average molecular weight of the polysilane copolymer C should fall within a range of between 500 and 1,000,000, preferably between 1,000 and 100,000. If the average molecular weight is less than 500, the polysilane copolymer C is taken into the main component of the thermosetting resin A, with the result that the cured material obtained from the resin composition tends to be lowered in its resistance to heat. By the contrary, where the average molecular weight of the polysilane copolymer C exceeds 1,000,000, the polysilane copolymer fails to be dispersed uniformly in the matrix, with the result that the cured material obtained from the resin composition tends to fail to exhibit a sufficiently low internal stress. In addition, the mechanical strength of the cured material tends to be lowered.

The polysilane copolymer used in the present invention can be synthesized, for example, as follows. Specifically, in the first step, silane compounds having a molecular structure including a monomer unit represented by formula (II) or (III) are polymerized to achieve a desired polymerization degree. Then, other silane compounds having a molecular structure including a monomer unit represented by the other formula are added to the resultant polymer so as to achieve copolymerization. When it comes to the silane compound having a molecular structure including a monomer unit represented by formula (II), the hydroxyl group of the silane compound is protected in advance by a protective group such as a siloxyl group or a alkoxy group. After the polymerization reaction, the protective group is removed by hydrolysis. The silane compound having a molecular structure including a monomer unit represented by formula (II) or (III) includes, for example, a dichlorosilane compound, a 4- or 5-membered cyclic silane compound and a disilene precursor. Particularly, it is desirable to use a cyclic silane compound and a disilene precursor in the present invention.

In the thermosetting resin composition according to the second embodiment of the present invention, it is desirable to add the polysilane copolymer C in an amount of 0.1 to 10% by weight, preferably 1 to 5% by weight, based on the total amount of the resin composition. Where the amount of the polysilane copolymer is smaller than 0.1% by weight, the cured material of the resultant resin composition tends to fail to exhibit a sufficiently low internal stress. On the other hand, if the amount of the polysilane copolymer is larger than 10% by weight, the cured material of the resin composition tends to be lowered in its mechanical strength. Also, the outer appearance of the cured material is likely to be impaired.

As in the thermosetting resin composition of the first embodiment, it is also possible for the thermosetting resin composition of the second embodiment to contain ordinary curing catalysts together with the thermosetting resin A used as a main component of the composition, the curing agent B for the resin A and the polysilane copolymer C acting as a modifying agent.

Further, it is also possible for the thermosetting resin composition of the second embodiment to contain, as desired, various additives including, for example, inorganic fillers such as quartz glass, fused silica, crystalline silica, glass fiber, talc, alumina, calcium silicate, calcium carbonate, barium sulfate, and magnesium; flame retarding assistants such as antimony trioxide; mold release agents such as natural waxes, synthetic waxes, straight-chain fatty acids and metal salts thereof, acid amides, esters, and paraffins; pigments such as carbon black and titanium dioxide; and surface treating agents such as a silane coupling agent.

Still further, additional agents for lowering the internal stress of the resin composition after cured can be used together with the polysilane copolymer C described previously, said additional agents including, for example, silicone rubber, silicone oil, various powdery plastic materials, powdery engineering plastic materials, powdery ABS resin and powdery MBS resin.

The thermosetting resin composition according to the second embodiment of the present invention can be prepared, for example, as follows. In the first step, the starting materials of the resin composition are sufficiently mixed by, for example, a mixer such as a Henschel mixer, followed by applying a melt mixing treatment to the resultant mixture by using, for example, a heat roll or a biaxial extruder. Finally, the molten mixture is cooled and, then, pulverized to obtain a desired resin composition.

In preparing the thermosetting resin composition of the second embodiment, it is desirable to add in advance a polysilane copolymer to at least one of the thermosetting resin and the curing agent in the form of a melt mixture in order to enable the polysilane copolymer to be dispersed uniformly in the thermosetting resin constituting the main component of the resin composition.

The thermosetting resin composition of the second embodiment is adapted for use as an encapsulating resin for a semiconductor device. The semiconductor device encapsulated with the cured material of the thermosetting resin composition is not particularly restricted. In general, a low pressure transfer molding is employed for encapsulating a semiconductor device with the thermosetting resin composition of the second embodiment. In addition, an injection molding, a compression molding, a cast molding, etc. can also be employed for encapsulating a semiconductor device with the resin composition of the present invention. It is desirable to cure the resin composition after the encapsulation by the heating at 150° C. or more.

Let us describe more in detail the thermosetting resin composition according to the second embodiment of the present invention with reference to Examples which follow:

EXAMPLES 12 TO 18 AND COMPARATIVE EXAMPLES 3 TO 8

The resin compositions consisting of the components shown in Table 5 were prepared as follows. In the first step, inorganic fillers were treated with a surface treating agent within a Henschel mixer. On the other hand, each of the polysilane, polysilane copolymer and silicone oil was added to and dispersed in a phenolic resin used as a curing agent, which had been melted in advance by heating, followed by cooling the molten mixture and, then, pulverizing the solidified mixture. Then, all the components including the surface-treated inorganic filler and the pulverized mixture were kneaded in a heat roll at 60° to 130° C, followed by cooling the kneaded mixture and subsequently pulverizing the mixture so as to obtain resin compositions shown in Table 5. The specific materials of the components shown in Table 5 are as follows:

Epoxy resin A: ESCN 195XL (trade name of o-cresol novolak epoxy resin manufactured by Sumitomo Chemical Co. Ltd., having an epoxy equivalent of 197)

Epoxy resin B: AER-755 (trade name of bisphenol A type brominated epoxy resin manufactured by Asahi Chemical Industry Co. Ltd., having an epoxy equivalent of 460)

Maleimide resin: N,N'-diphenyl methane bismaleimide having a molecular weight of 358

Curing agent: BRG-557 (trade name of a phenol novolak resin manufactured by Showa High Polymer Co. Ltd., having a phenol equivalent of 104)

Polysilane copolymer A: A block copolymer represented by formula (IV) given below and having an average molecular weight of 10,000

Polysilane copolymer B: A block copolymer represented by formula (V) given below and having an average molecular weight of 5,000

Polysilane copolymer C: A block copolymer represented by formula (VI) given below and having an average molecular weight of 12,000

Polysilane copolymer D: A block copolymer represented by formula (VII) given below and having an average molecular weight of 10,000

Polysilane copolymer E: A block copolymer represented by formula (VIII) given below and having an average molecular weight of 12,000

Polysilane A: A polysilane represented by formula (IX) given below and having an average molecular weight of 10,000

Polysilane B: A polysilane represented by formula (X) given below and having an average molecular weight of 9,000

Silicone oil A: TSF 451-1M (trade name of polydimethyl siloxane manufactured by Toshiba Silicone K. K. and having a viscosity of 10,000 cp)

Silicone oil B: Dimethyl siloxane modified with phenol at both terminals, having a viscosity of 250 cp Curing catalyst A: PP-360 (trade name of triphenyl phosphine manufactured by KI Chemical Industry Co. Ltd.)

Curing catalyst B: Dicumyl peroxide

Mold release agent: Carnauba wax

Pigment: Carbon black

Flame retarding assistant: Antimony trioxide

Inorganic filler: Fused silica powder having an average particle diameter of 20 microns Surface treating agent: A-187 (trade name of γ-glycidoxypropyl trimethoxy silane manufactured by Nippon Unicar K. K.)

TABLE 5

|  | Examples |  |  |  |  |  |  | Comparative Examples |  |  |  |  |  |
|---|---|---|---|---|---|---|---|---|---|---|---|---|---|
|  | 12 | 13 | 14 | 15 | 16 | 17 | 18 | 3 | 4 | 5 | 6 | 7 | 8 |
| Epoxy resin A | 10.8 | 10.8 | 10.8 | 9.5 | 3.8 | 11.5 | — | 12.1 | 10.8 | 10.8 | 10.8 | 10.8 | — |
| Epoxy resin B | 2.5 | 2.5 | 2.5 | 2.5 | 2.5 | 2.5 | 2.5 | 2.5 | 2.5 | 2.5 | 2.5 | 2.5 | 2.5 |
| Maleimide resin | — | — | — | — | — | — | 12.7 | — | — | — | — | — | 12.7 |
| Curing agent | 6.3 | 6.3 | 6.3 | 5.6 | 6.3 | 5.6 | 4.2 | 7.0 | 6.3 | 6.3 | 6.3 | 6.3 | 4.2 |
| Polysilane copolymer A | 2.0 | — | — | — | — | — | 2.0 | — | — | — | — | — | — |
| Polysilane copolymer B | — | 2.0 | — | — | — | — | — | — | — | — | — | — | — |
| Polysilane copolymer C | — | — | 2.0 | 4.0 | — | — | — | — | — | — | — | — | — |
| Polysilane copolymer D | — | — | — | — | 3.0 | — | — | — | — | — | — | — | — |
| Polysilane copolymer E | — | — | — | — | — | 2.0 | — | — | — | — | — | — | — |
| Polysilane A | — | — | — | — | — | — | — | — | 2.0 | — | — | — | — |
| Polysilane B | — | — | — | — | — | — | — | — | — | 2.0 | — | — | — |
| Silicon oil A | — | — | — | — | — | — | — | — | — | — | 2.0 | — | 2.0 |
| Silicon oil B | — | — | — | — | — | — | — | — | — | — | — | 2.0 | — |
| Curing catalyst A | 0.2 | 0.2 | 0.2 | 0.2 | 0.2 | 0.2 | 0.1 | 0.2 | 0.2 | 0.2 | 0.2 | 0.2 | 0.1 |
| Curing catalyst B | — | — | — | — | — | — | 0.05 | — | — | — | — | — | 0.05 |
| Mold release agent | 0.5 | 0.5 | 0.5 | 0.5 | 0.5 | 0.5 | 0.8 | 0.5 | 0.5 | 0.5 | 0.5 | 0.5 | 0.8 |
| Pigment | 0.4 | 0.4 | 0.4 | 0.4 | 0.4 | 0.4 | 0.4 | 0.4 | 0.4 | 0.4 | 0.4 | 0.4 | 0.4 |
| Flame retarding assistant | 2.0 | 2.0 | 2.0 | 2.0 | 2.0 | 2.0 | 2.0 | 2.0 | 2.0 | 2.0 | 2.0 | 2.0 | 2.0 |
| Inorganic filler | 75.0 | 75.0 | 75.0 | 75.0 | 75.0 | 75.0 | 75.0 | 75.0 | 75.0 | 75.0 | 75.0 | 75.0 | 75.0 |
| Surface treating agent | 0.3 | 0.3 | 0.3 | 0.3 | 0.3 | 0.3 | 0.3 | 0.3 | 0.3 | 0.3 | 0.3 | 0.3 | 0.3 |

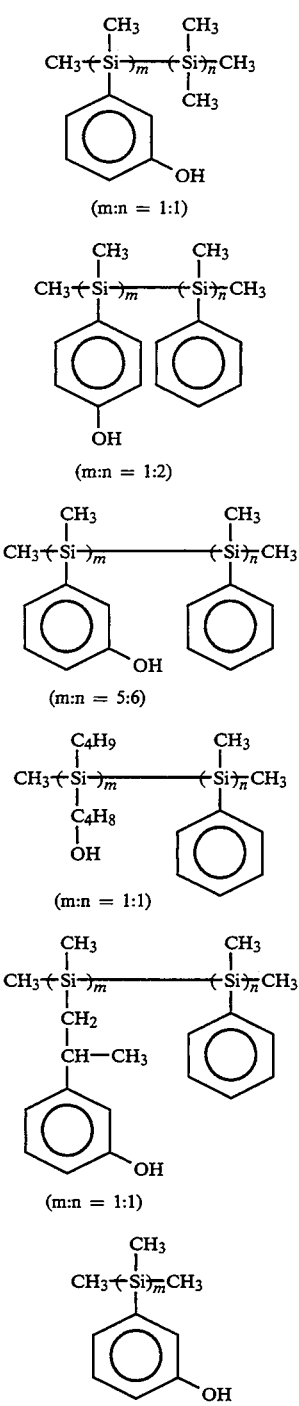

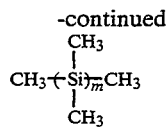

Each of the resin compositions thus prepared was subjected to various evaluation tests as follows:

i) Each of the test pieces prepared from the resin compositions was tested for measuring a thermal expansion coefficient, a glass transition temperature, a flexural modulus, a bending strength, and water absorption rate. Each test piece was prepared by subjecting the resin composition to a transfer molding at 175° C. for 3 minutes, followed by applying an after-cure treatment to resultant molding at 180° C. for 4 hours.

Also, an additional test piece was prepared by molding each of the resin compositions on an 42 alloy used as a frame material so as to measure a bonding strength of the resin composition in the pulling direction.

ii) In order to examine the humidity resistance of the resin composition, a PCT test was conducted as follows. In the first step, a test device was encapsulated with each of the resin compositions, followed by applying an after-cure treatment at 180° C. for 4 hours so as to obtain a resin encapsulated semiconductor device. Then, the encapsulated semiconductor device was left to stand for 72 hours under an atmosphere having a temperature of 85° C. and a relative humidity of 85% so as to allow the device to absorb moisture, followed by exposing the device to an atmosphere of a fluorocarbon vapor of 215° C. for one minute. The crack occurrence in the package was measured at this stage. The resin encapsulated semiconductor device was further left to stand for a predetermined period of time in an atmosphere of a saturated steam of 127° C. so as to evaluate the resistance to humidity by measuring the occurrence of defects (leak defect and open defect).

iii) In order to examine the thermal shock resistance of the resin composition, a TCT test was conducted as follows. In the first step, a large device (8 mm×8 mm) for testing a thermal shock resistance was encapsulated with each of the resin compositions, followed by applying an after-cure treatment at 180° C. for 4 hours. The resin encapsulated semiconductor device thus prepared was subjected to thermal cycles, each cycle consisting of cooling at −65° C. and then, through room temperature, heating to 150° C. The thermal cycles were performed 50 to 400 times so as to determine the defect occurrence by checking the operating characteristics of the device. Tables 6 and 7 shows the results of these tests.

TABLE 6

|  | Examples | | | | | | | Comparative Examples | | | | | |
|---|---|---|---|---|---|---|---|---|---|---|---|---|---|
|  | 12 | 13 | 14 | 15 | 16 | 17 | 18 | 3 | 4 | 5 | 6 | 7 | 8 |
| Flexural Modulus (kg/mm$^2$) | 1300 | 1310 | 1300 | 1250 | 1150 | 1200 | 1650 | 1650 | 1350 | 1380 | 1220 | 1300 | 1600 |
| Bending Strength (kg/mm$^2$) | 13.0 | 13.5 | 12.8 | 11.8 | 11.9 | 12.6 | 14.5 | 16.0 | 13.5 | 10.0 | 8.5 | 10.5 | 10.5 |
| Thermal expansion coefficient (1/deg) × 10$^5$ | 1.3 | 1.3 | 1.3 | 1.3 | 1.3 | 1.3 | 1.1 | 1.5 | 1.4 | 1.3 | 1.3 | 1.3 | 1.2 |
| Glass transition temperature (°C.) | 165 | 165 | 160 | 157 | 160 | 162 | 220 | 170 | 130 | 168 | 167 | 145 | 215 |

TABLE 6-continued

| | Examples | | | | | | | Comparative Examples | | | | | |
|---|---|---|---|---|---|---|---|---|---|---|---|---|---|
| | 12 | 13 | 14 | 15 | 16 | 17 | 18 | 3 | 4 | 5 | 6 | 7 | 8 |
| Water absorption rate (wt %) | 0.44 | 0.44 | 0.44 | 0.40 | 0.41 | 0.40 | 0.60 | 0.58 | 0.50 | 0.48 | 0.45 | 0.49 | 0.68 |
| Bonding Strength (kg/cm²) | 2.5 | 2.8 | 2.5 | 3.5 | 3.7 | 2.6 | 2.2 | 0.1 | 1.0 | 2.0 | 3.0 | 2.5 | 2.0 |

TABLE 7

| | | Examples | | | | | | | Comparative Examples | | | | | |
|---|---|---|---|---|---|---|---|---|---|---|---|---|---|---|
| | | 12 | 13 | 14 | 15 | 16 | 17 | 18 | 3 | 4 | 5 | 6 | 7 | 8 |
| PCT Test (Defective samples/ all samples) | Crack occurrence after moisture absorption treatment | 0/20 | 0/20 | 0/20 | 0/20 | 0/20 | 0/20 | 0/20 | 20/20 | 20/20 | 10/20 | 20/20 | 10/20 | 8/20 |
| | 100 hour | 0/20 | 0/20 | 0/20 | 0/20 | 0/20 | 0/20 | 0/20 | 0/20 | 0/20 | 0/20 | 0/20 | 0/20 | 0/20 |
| | 200 hour | 0/20 | 0/20 | 0/20 | 0/20 | 0/20 | 0/20 | 0/20 | 5/20 | 10/20 | 0/20 | 0/20 | 0/20 | 0/20 |
| | 300 hour | 0/20 | 0/20 | 0/20 | 0/20 | 0/20 | 0/20 | 0/20 | 20/20 | 20/20 | 12/20 | 0/20 | 0/20 | 5/20 |
| | 400 hour | 0/20 | 0/20 | 0/20 | 0/20 | 0/20 | 0/20 | 0/20 | — | — | 20/20 | 18/20 | 10/20 | 18/20 |
| | 500 hour | 0/20 | 0/20 | 0/20 | 0/20 | 0/20 | 0/20 | 2/20 | — | — | — | 20/20 | 20/20 | 20/20 |
| TCT Test (Defective samples/ all samples) | 50 | 0/20 | 0/20 | 0/20 | 0/20 | 0/20 | 0/20 | 0/20 | 0/20 | 0/20 | 0/20 | 0/20 | 0/20 | 0/20 |
| | 100 | 0/20 | 0/20 | 0/20 | 0/20 | 0/20 | 0/20 | 0/20 | 10/20 | 0/20 | 0/20 | 0/20 | 0/20 | 0/20 |
| | 200 | 0/20 | 0/20 | 0/20 | 0/20 | 0/20 | 0/20 | 0/20 | 20/20 | 0/20 | 0/20 | 0/20 | 0/20 | 10/20 |
| | 300 | 0/20 | 0/20 | 0/20 | 0/20 | 0/20 | 0/20 | 0/20 | — | 0/20 | 10/20 | 15/20 | 18/20 | 20/20 |
| | 400 | 2/20 | 0/20 | 1/20 | 0/20 | 0/20 | 0/20 | 0/20 | — | 5/20 | 18/20 | 20/20 | 20/20 | — |

As apparent from Tables 6 and 7, the cured materials obtained from the resin composition according to the second embodiment of the present invention is low in flexural modulus, indicating reduction of the internal stress of the cured material, and exhibits a high mechanical strength such as a bending strength. It follows that the semiconductor device encapsulated with the cured material of the resin composition according to the second embodiment of the present invention exhibits a high humidity resistance and a high thermal shock resistance. As a matter of fact, the semiconductor device encapsulated with the cured material of the resin composition of the second embodiment was substantially free from defect occurrence in any of the PCT test and the TCT test.

What is claimed is:

1. A thermosetting resin composition, comprising:
   (a) a silane compound having the formula (I):

wherein each of $R_1$, $R_2$, $R_3$ and $R_4$ is a monovalent organic group, at least one of $R_1$ and $R_2$ is a monovalent organic group having a phenolic hydroxyl group, and m and n are integers having values such that ($4 \leq m+n \leq 12$); and
   (b) an organic compound having at least two functional groups capable of reaction with the phenolic hydroxyl groups of said silane compound.

2. A thermosetting resin composition, comprising:
   (a) a silane compound having the formula (I):

wherein each of $R_1$, $R_2$, $R_3$ and $R_4$ is a monovalent organic group, at least one of $R_1$ and $R_2$ is a monovalent organic group having a phenolic hydroxyl group, and m and n are integers having values such that ($4 \leq m+n \leq 12$); and
   (b) an organic compound having at least two functional groups capable of reaction with the phenolic hydroxyl groups of said silane compound, and
   wherein said silane compound (a) is added in an amount of more than 10 parts by weight relative to 100 parts by weight of said organic compound (b).

3. The resin composition according to claim 1 or 2, wherein the value of m+n in formula (I), representing said silane compound, falls within a range of between 6 and 12, ($6 \leq m+n \leq 12$), and said silane compound has a cyclic molecular structure.

4. The resin composition according to claim 1 or 2, wherein said organic group included in the silane compound represented by the formula (I) is selected from the group consisting of methyl, ethyl, propyl, i-propyl, butyl, i-butyl, t-butyl, pentyl, hexyl, heptyl, octyl, nonyl, decyl, phenyl, tolyl, trifluoromethyl phenyl, α-naphthyl, p-biphenyl, pyridyl, amino phenyl, N-methyl pyrrolyl, furyl, thienyl and N-methyl indoryl groups.

5. The resin composition according to claim 1 or 2, wherein said silane compound represented by the formula (I) is selected from the group consisting of hexa (p-hydroxyphenyl) hexamethyl cyclohexasilane, tetra (p-hydroxyphenyl) hexamethyl tetrasilane and 1,8-dihydroxy-octa (p-hydroxyphenyl) octamethyl octasilane.

6. The resin composition according to claim 1 or 2, wherein said organic compound (b) is at least one resin selected from the group consisting of an epoxy resin, a maleimide resin, an amine compound and an oxazoline compound.

7. The resin composition according to claim 1 or 2, wherein said organic compound (b) is an epoxy resin, and silane compound (a) is added in an amount of 30 to 150 parts by weight relative to 100 parts by weight of said epoxy resin.

8. The resin composition according to claim 7, wherein said epoxy resin is at least one resin selected from the group consisting of a bisphenol A epoxy resin, novolak epoxy resin, an alicyclic epoxy resin, an epoxy resin derived from tri- or tetra- (hydroxyphenyl) alkane, and a bis- hydroxybiphenyl epoxy resin.

9. The resin composition according to claim 1 or 2, wherein said organic compound (b) is a maleimide resin, and said silane compound (a) is added in an amount of 10 to 50 parts by weight relative to 100 parts by weight of said maleimide compound.

10. The resin composition according to claim 9, wherein said maleimide resin is at least one resin selected from the group consisting of 2,2-bis (4-phenoxyphenyl)-N,N'-bismaleimide, N,N'-phenylene bismaleimide, N,N'-hexamethylene bismaleimide, N-N'-diphenyl methane bismaleimide, N,N'-oxy-di-p-phenylene bismaleimide, N,N'-4,4'-benzophenone bismaleimide, N,N'-p-diphenylsulfone bismaleimide, N,N'-(3,3'-dimethyl) methylene-di-p-phenylene bismaleimide, poly(phenylmethylene) polymaleimide, bis (4-phenoxyphenyl) sulfone-N,N'-bismaleimide, 1,4-bis (4-phenoxy) benzene-N,N'-bismaleimide, 1,3-bis (4-phenoxy) benzene-N,N'-bismaleimide and 1,3-bis(3-phenoxy)benzene-N,N'-bismaleimide.

* * * * *